Patented Dec. 13, 1927.

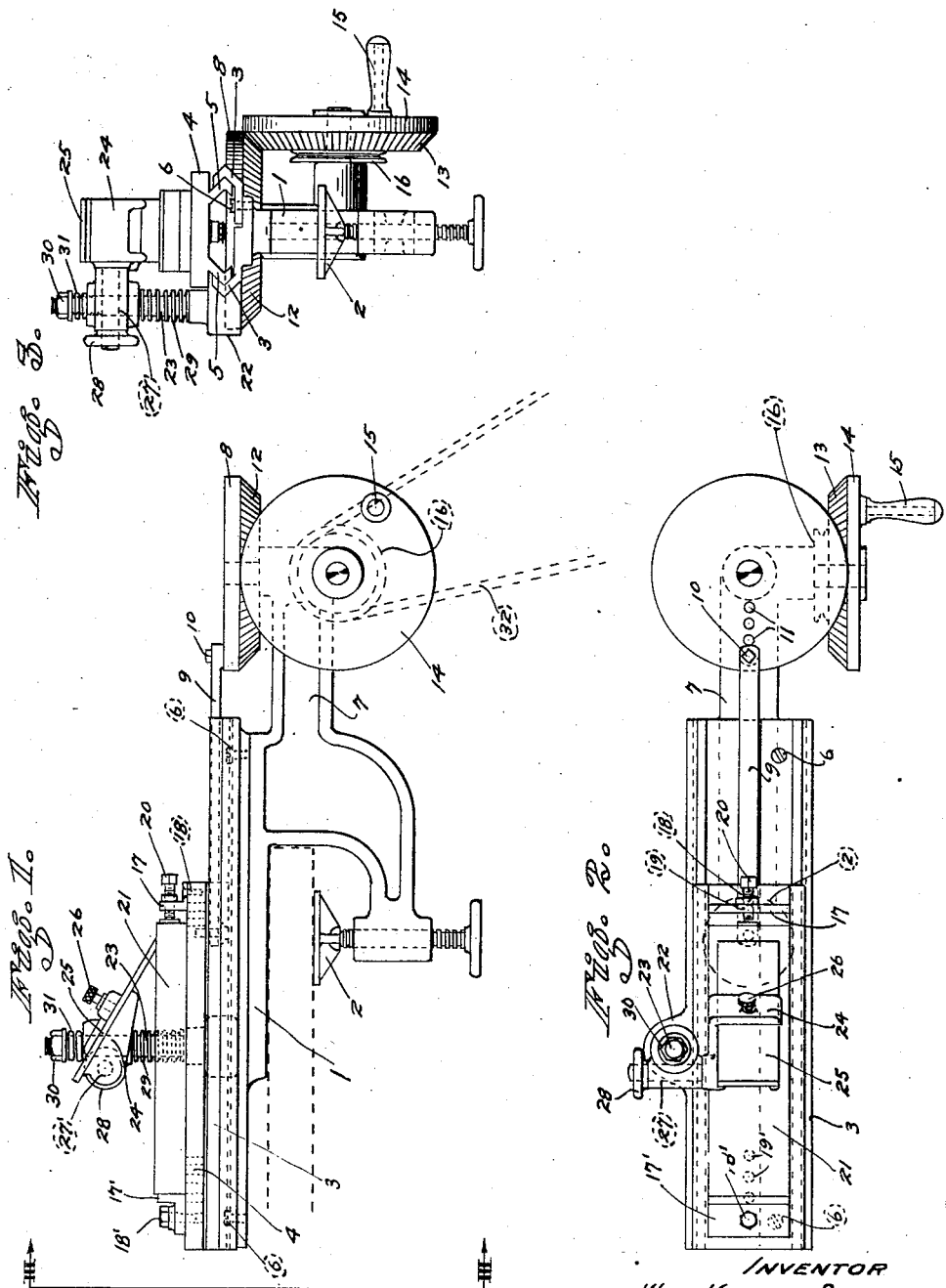

1,652,469

UNITED STATES PATENT OFFICE.

WILL KIMBALL DODGE, OF FORT BRAGG, CALIFORNIA.

TOOL-SHARPENING MACHINE.

Application filed June 30, 1924. Serial No. 723,327.

This invention relates to grindstones as used for the grinding of tools of various kinds and particularly to the variety of stones generally known as whetstones on which the tool to be sharpened is rubbed back and forth while the stone remains stationary.

The objects of my invention are to provide a machine which will clamp the whet stone and give it a reciprocatory motion while the tool is held stationary and pressed upon the stone, also such a machine which will accommodate ordinary whet stones of varying thicknesses or length, also which will provide any desired length of stroke whereby the machine may be set to give the most effective stroke for the particular length of stone used, also which may be operated by turning a hand crank or may be run by power, also which will provide for clamping to a work bench, also which will present the tool at any desired angle to the stone and which will have feeding means so that the tool can be accurately advanced toward the stone as it is ground off.

The above and other objects are realized in the construction shown in the accompanying drawings and in which:

Figure 1 is a side view of my machine, Figure 2 a plan view, and Figure 3 an end view.

Before going into constructional detail, it should be noted that my invention may assume a variety of forms and still function to realize the objects of the invention, therefore, the drawings must be considered as showing one form only of reducing the invention to practice.

In the form shown (1) is a frame preferably provided with a clamp (2) for clamping it to a bench or table, and the upper part of the frame forms two parallel V guides (3) as more clearly shown in Figure 3.

Projecting above and mounted between the guides is a flat carriage (4) having V shaped shoulders (5) engaging the guides and adapted for sliding therein.

One of the guides is made separate and is adjustable on the frame by means of the screws (6) for accurately adjusting the working fit to the carriage shoulders.

At the end of the frame is an extension arm (7) revolvably supporting a horizontally disposed disk (8) connected by a crank arm (9) to the carriage whereby upon revolution of the disk the carriage is reciprocated.

The throw of the crank may be altered by changing its pivotal screw connection (10) to any of the various screw threaded holes (11) in the disc so that the length of stroke can be adjusted for the stone used upon the carriage.

On the under side of the disk is a bevel gear ring (12) meshing with a similar gear ring (13) carried by a drive wheel (14). This wheel has a hand crank (15) by which it may be turned and upon the reverse side of the wheel is a smaller grooved pulley rim (16) adapted to receive a belt as dotted at (32) in case it is desired to run the machine by power.

To secure the whet stone upon the carriage a pair of adjustable clamps are used, one (17) is held to the carriage by a screw (18) adapted to fit into any of the tapped holes (19) in the carriage top and is provided with a set screw (20) for bearing against the stone (21) to force it against a clamp (17') held by a screw (18') engaging selectively the holes (19').

The frame has a bracket (22) carrying a post (23) supporting an adjustable tool carrier (24) in which a tool (25) is clamped by the screw (26) and held for grinding by the reciprocating stone.

The carrier may be revolved on the horizontal pivot (27) and clamped to any position by the nut (28) but is at all times free to rise and fall on the post, and is feathered to the post to prevent revolving movement.

A spiral spring (29) surrounds the post and normally forces the carrier upward to lift the tool from the stone, and above the carrier the post is threaded and has a feed nut (30) adapted for screwing down to force the carrier and tool down toward the stone, but between the nut and carrier is a small spring (31) to make the action of the feed nut resilient so that the tool will be yieldingly pressed upon the stone to compensate for any inequality in the stone and also to maintain the feed for an appreciable grinding of the tool.

Of course various forms of tool holders will be devised to suit the particular tool being ground and I therefore do not desire to limit myself to this one construction.

I claim:

A grinding machine comprising a frame, a reciprocable carriage thereon, means for clamping a grindstone to the carriage and adjustable means for resiliently holding a tool against the stone, said means comprising a post, a sleeve slidable thereon and being feathered thereto, a tool carrier loosely pivoted to said sleeve, a coiled spring around the post and below the sleeve exerting an upward pressure on the sleeve, said post being threaded above the sleeve, a feed nut engaging the threaded portion of said post and a second coiled spring around said post between said sleeve and said nut whereby the second spring may exert a desired pressure on said sleeve.

WILL KIMBALL DODGE.